United States Patent
Shariff

(10) Patent No.: US 11,036,048 B2
(45) Date of Patent: Jun. 15, 2021

(54) VIRTUAL REALITY SYSTEM AND METHOD FOR DISPLAYING ON A REAL-WORLD DISPLAY A VIEWABLE PORTION OF A SOURCE FILE PROJECTED ON AN INVERSE SPHERICAL VIRTUAL SCREEN

(71) Applicant: Project Whitecard Digital Inc., Winnipeg (CA)

(72) Inventor: Khaled Shariff, Winnipeg (CA)

(73) Assignee: Project Whitecard Digital Inc., Winnipeg (CA)

( * ) Notice: Subject to any disclaimer, the term of this patent is extended or adjusted under 35 U.S.C. 154(b) by 0 days.

(21) Appl. No.: 16/592,247

(22) Filed: Oct. 3, 2019

(65) Prior Publication Data
US 2020/0110263 A1   Apr. 9, 2020

Related U.S. Application Data

(60) Provisional application No. 62/740,674, filed on Oct. 3, 2018.

(51) Int. Cl.
*G02B 27/01* (2006.01)
*G06F 3/01* (2006.01)
*G06T 19/00* (2011.01)

(52) U.S. Cl.
CPC ........... *G02B 27/017* (2013.01); *G06F 3/013* (2013.01); *G06F 3/017* (2013.01); *G06T 19/006* (2013.01); *G02B 2027/014* (2013.01); *G02B 2027/0138* (2013.01)

(58) Field of Classification Search
CPC .......... G02B 27/017; G02B 2027/0138; G02B 2027/014; G02B 27/0093; G06F 3/013; G06F 3/017; G06F 3/012; G06F 3/011; G06T 19/006
See application file for complete search history.

(56) References Cited

U.S. PATENT DOCUMENTS

| | | | |
|---|---|---|---|
| 8,845,426 B2 * | 9/2014 | Ohta | A63F 13/211 463/30 |
| 9,411,410 B2 * | 8/2016 | Noda | G02B 27/0179 |
| 9,652,896 B1 * | 5/2017 | Jurgenson | G06F 3/012 |
| 9,727,095 B2 * | 8/2017 | Vaananen | G06F 1/1686 |
| 9,835,448 B2 * | 12/2017 | Allen | G03H 1/2249 |
| 10,192,358 B2 * | 1/2019 | Robbins | G06T 19/006 |

(Continued)

*Primary Examiner* — Grant Sitta
(74) *Attorney, Agent, or Firm* — Christopher J Dynowski; Ryan W Dupuis; Ade & Company Inc.

(57) ABSTRACT

A virtual reality system and method comprises a display for displaying an image to a user, a tracking device for detecting location of the user's head relative to the display and a computing device respectively operatively connected to the display and to the tracking device, the computing device having a processor and a non-transitory memory which are operatively interconnected so that the processor can execute instructions stored on the memory for: projecting a source file on an inverse spherical virtual screen sized larger than the display; using a mathematical model relating the location of the user's head, the display and the virtual screen, determining a visible portion of the projected source file viewable to the user through the display acting as a viewing window between the user and the projected source file; and displaying on the display said visible portion of the projected source file.

15 Claims, 7 Drawing Sheets

(56) References Cited

U.S. PATENT DOCUMENTS

| | | | | |
|---|---|---|---|---|
| 2007/0273795 | A1* | 11/2007 | Jaynes | H04N 9/3147 |
| | | | | 348/745 |
| 2012/0026166 | A1* | 2/2012 | Takeda | A63F 13/06 |
| | | | | 345/419 |
| 2012/0169846 | A1* | 7/2012 | Li | G03B 35/06 |
| | | | | 348/46 |
| 2012/0300020 | A1* | 11/2012 | Arth | G06T 7/75 |
| | | | | 348/36 |
| 2014/0055578 | A1* | 2/2014 | Wu | G06F 3/0484 |
| | | | | 348/51 |
| 2014/0098186 | A1* | 4/2014 | Seidl | G06F 3/011 |
| | | | | 348/36 |
| 2014/0314336 | A1* | 10/2014 | Yagi | G06T 3/0018 |
| | | | | 382/282 |
| 2015/0193982 | A1* | 7/2015 | Mihelich | H04L 67/18 |
| | | | | 345/633 |
| 2016/0080710 | A1* | 3/2016 | Hattingh | H04N 9/3194 |
| | | | | 348/52 |
| 2016/0165205 | A1* | 6/2016 | Liu | H04N 13/359 |
| | | | | 348/40 |
| 2016/0314727 | A1* | 10/2016 | Bui | G06F 3/0425 |
| 2016/0358382 | A1* | 12/2016 | Lee | H04N 9/31 |
| 2017/0105619 | A1* | 4/2017 | Ebisawa | A61B 3/0025 |
| 2017/0243403 | A1* | 8/2017 | Daniels | G06T 19/20 |
| 2018/0182083 | A1* | 6/2018 | Natroshvili | G06K 9/4628 |
| 2018/0225408 | A1* | 8/2018 | Ziolo | G06F 30/00 |
| 2018/0322683 | A1* | 11/2018 | Dimitrov | G06T 15/205 |
| 2018/0374192 | A1* | 12/2018 | Kunkel | G06T 15/205 |
| 2019/0124313 | A1* | 4/2019 | Li | G06T 15/06 |
| 2019/0266802 | A1* | 8/2019 | Jarvenpaa | G02B 27/0172 |
| 2019/0297317 | A1* | 9/2019 | Lam | H04N 13/351 |
| 2020/0057311 | A1* | 2/2020 | Radel | G02B 30/26 |
| 2020/0162713 | A1* | 5/2020 | Zink | H04N 13/332 |

* cited by examiner

VIRTUAL REALITY SYSTEM AND METHOD FOR DISPLAYING ON A REAL-WORLD DISPLAY A VIEWABLE PORTION OF A SOURCE FILE PROJECTED ON AN INVERSE SPHERICAL VIRTUAL SCREEN

This application claims the benefit under 35 U.S.C. 119(e) of U.S. Provisional Application Ser. No. 62/740,674 filed Oct. 3, 2018, which is incorporated by reference herein.

FIELD OF THE INVENTION

The present invention relates generally to a system and method for generating a virtual reality environment, and more particularly to such a system and method which operates without a user-worn optical device such as 3D glasses or a virtual reality headset.

BACKGROUND

A conventional virtual reality environment commonly requires the user to wear an optical device such as 3D glasses or a virtual reality headset in order to view the environment. This typically adds to the cost and/or complexity of the system implementing the virtual reality environment.

There exists an opportunity to develop a system which forgoes user-worn optical devices and can be implemented with the use of commercially available hardware components.

SUMMARY OF THE INVENTION

According to an aspect of the invention there is provided a virtual reality system comprising:
  a display for displaying an image to a user;
  a tracking device for detecting location of the user's head relative to the display; and
  a computing device respectively operatively connected to the display and to the tracking device, the computing device having a processor and a non-transitory memory which are operatively interconnected so that the processor can execute instructions stored on the memory for:
    projecting a source file on an inverse spherical virtual screen sized larger than the display;
    using a mathematical model relating the location of the user's head, the display and the virtual screen, determining a visible portion of the projected source file viewable to the user through the display acting as a viewing window between the user and the projected source file; and
    displaying on the display said visible portion of the projected source file.

According to another aspect of the invention there is provided a computer-implemented method for generating a virtual reality environment on a system without a user-worn optical device, the system including a display for displaying an image to a user, a tracking device for detecting location of a user's head relative to the display, and a computing device respectively operatively connected to the display and to the tracking device, the computing device having a processor and a non-transitory memory which are operatively interconnected so that the processor can execute instructions stored on the memory, the method comprising:
  projecting, using the computing device, a source file on an inverse spherical virtual screen sized larger than the display;
  using a mathematical model relating the location of the user's head, the display and the virtual screen, determining, using the computing device, a visible portion of the projected source file viewable to a user through the display acting as a viewing window between the user and the projected source file; and
  displaying on the display said visible portion of the projected source file.

According to yet another aspect of the invention there is provided a non-transitory computer readable storage medium storing instructions that are executable to:
  project a source file on an inverse spherical virtual screen sized larger than a real display for displaying an image to a user;
  using a mathematical model relating the location of the user's head, the real display and the virtual screen, determine a visible portion of the projected source file viewable to the user through the real display acting as a viewing window between the user and the projected source file; and
  display on the real display said visible portion of the projected source file.

According to such arrangements it is possible to create a virtual reality experience where a display such as a television screen acts as a viewing window into the virtual reality environment, similarly to interaction of a person with a window in a building where movement relative to the window enables the person to view different portions of the environment separated from the user by the window. The only input to the system for viewing the virtual reality environment is the user's head location relative to the display.

Preferably, determining the visible portion of the projected source file includes inversely scaling a size of the visible portion relative to a size of the display based on a distance of the user's head from the display.

At least in some arrangements there is also included correcting the visible portion of the projected source file for skew based on the location of the user's head relative to a vertical plane oriented normal to the mathematically modeled display so that the displayed visible portion has uniform scale across the surface area of the display.

At least in some arrangements, the mathematical model also includes a surrounding space in which the display is located.

The display may comprise a plurality of displays each positioned relative to a common viewing space so that each display shows a different visible portion of the same projected source file that is viewable through a corresponding one of the displays to the same user. In such arrangements, determining the visible portion of the projected source file comprises determining a respective visible portion of the same projected source file viewable through a corresponding one of the displays to the same user.

BRIEF DESCRIPTION OF THE DRAWINGS

The invention will now be described in conjunction with the accompanying drawings in which.

In the drawings like characters of reference indicate corresponding parts in the different figures.

DETAILED DESCRIPTION

Figure 1:
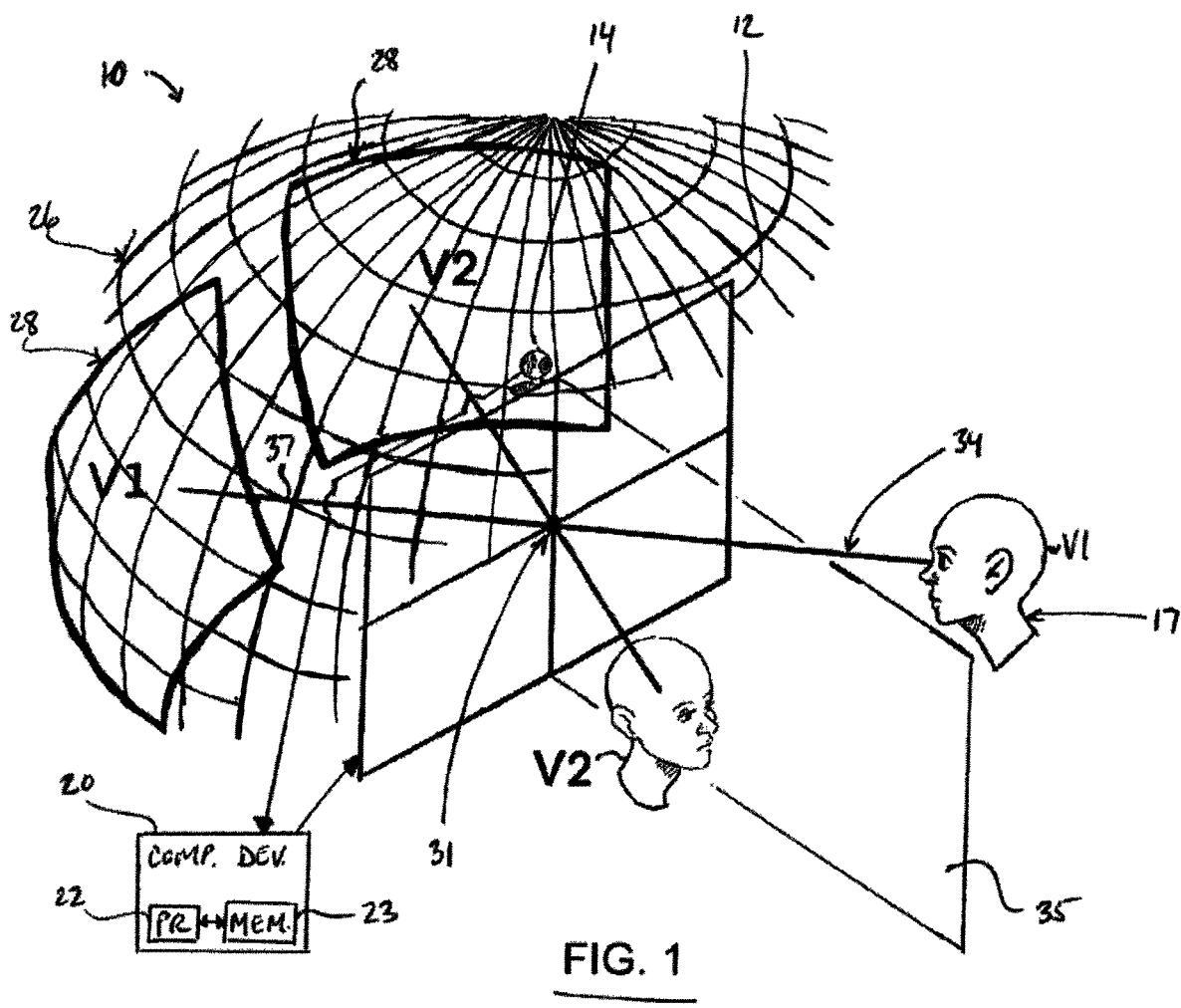
FIG. 1 illustrates a virtual reality system according to an arrangement of the present invention.

FIG. 1 shows a virtual reality system 10 which comprises a real-world, or simply real, display 12 configured for displaying an image, a tracking device 14 (in other words, a tracker) configured for detecting location of a user's head 17 relative to the display 12, and a computing device 20 respectively operatively connected to the display 12 and to the tracking device 14 and having a processor 22 and a non-transitory memory 23 (in other words, a computer readable medium) which are operatively interconnected so that the processor 22 can execute instructions stored on the memory 23.

The memory 23 has stored thereon instructions for:
projecting a source file 24 on an inverse spherical virtual screen 26 sized larger than the display 12;
using a mathematical model relating the location of the user's head 17, the display 12 and the virtual screen 26, determining a visible portion of the projected virtual reality image (schematically shown at 28) viewable to the user through the display 12 acting as a viewing window between the user and the projected source file; and
displaying on the display 12 the visible portion of the projected source file.

The user interacts with the display 12 in a similar manner as with a window in a building that separates one space from another. When the user moves to the left of the window, he/she sees that portion of the environment looking out the window and towards the right. Conversely, moving to the right of the window enables the user to see that portion of the environment visible through the window and towards the left. Further, by moving towards the window a greater portion of the environment becomes visible to the user. Conversely, moving farther away from the window reduces the portion of the environment that is visible through the window. Regardless of distance of the user from the window, the size of the objects in the environment remains the same.

Figure 2:
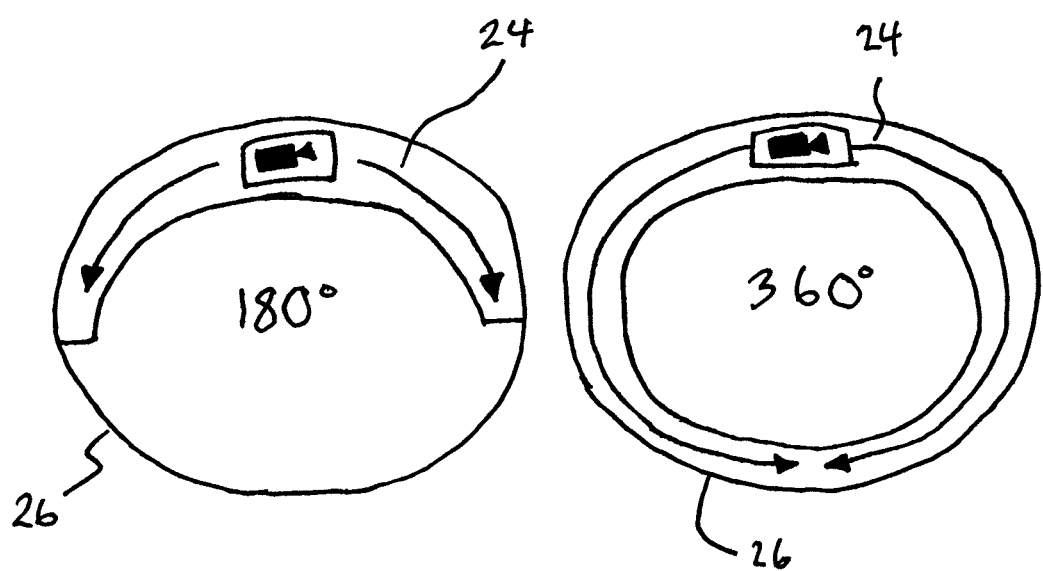
FIG. 2 schematically illustrates different types of source files projected on an inverse spherical virtual screen.

To enable such functionality, software which is executable on the computing device 20 includes a three-dimensional (3D) environment and programming. The 3D environment comprises an inverse projection sphere 26. The programming is configured to track the user's head 17 and adjust that portion of the 3D environment visible to the user. The source file typically comprises a special "360" image or video on the screen, alternatively known in industry as a virtual reality image or video (which is simply a series of images). Virtual reality images are widely available, and 360 or 180 inverse spherical video is common and distributed on YouTube and elsewhere. As schematically shown in FIG. 2, depending on the source file 24, either half of the inverse spherical virtual screen or the whole virtual screen is used.

Figures 3A, 3B:
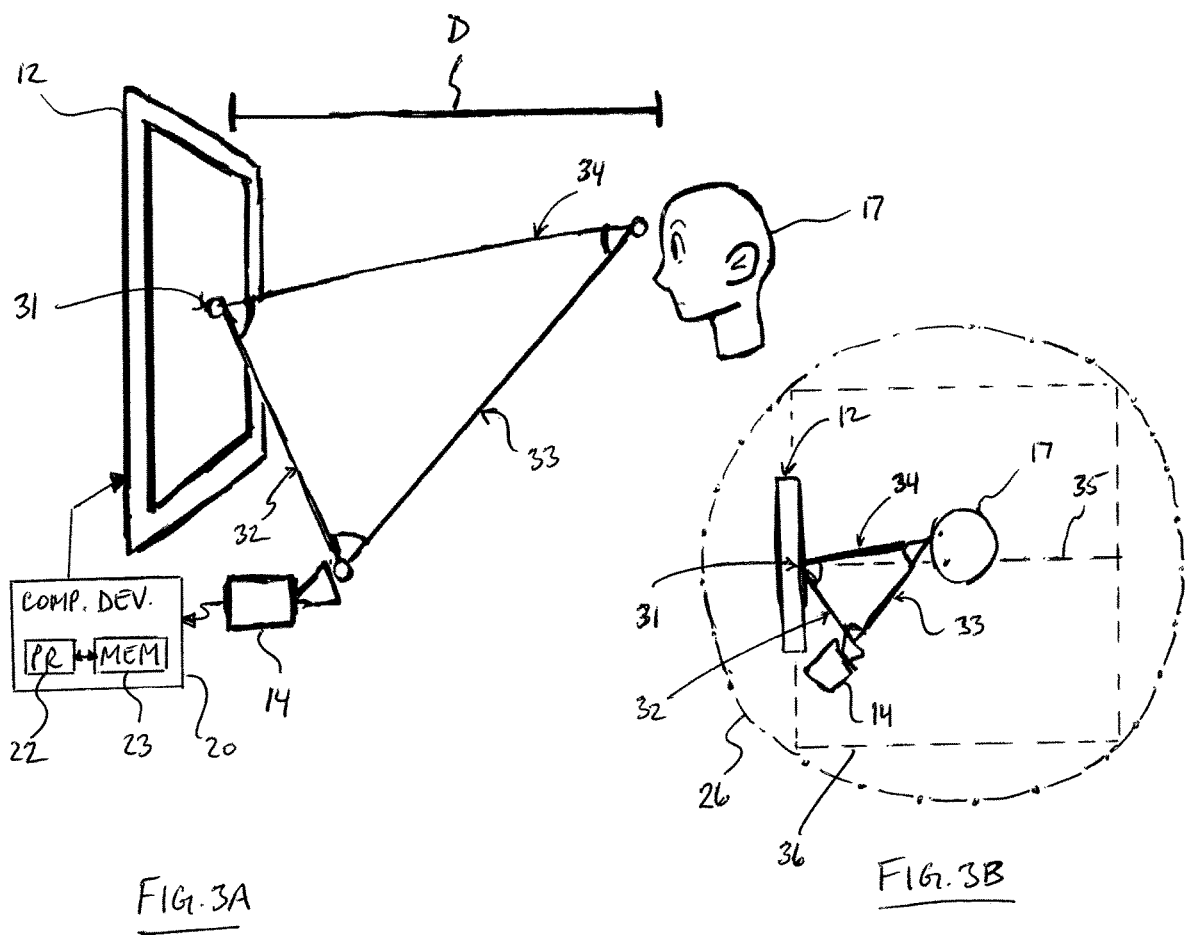
FIGS. 3A and 3B illustrate calculation of a user's head location relative to a display of the arrangement of virtual reality system of FIG. 1, in side and plan views, respectively.

The computing device 20 may be a small computer or smart device like a Roku or a CPU connected to the display 12 such as a television. The tracking device 14 may be a camera which tracks the user's head location. Alternatively, the tracking device 14 may comprise, for example, virtual reality (VR) lasers or infrared detection of the remote. The camera is also connected to the computing device 20. As more clearly shown in FIG. 3A, the tracking device 14 detects the user's head 17 and provides the information as input to the computing device 20 which subsequently determines relative location of the user's head to a central reference point 31 on a viewing plane of the display 12 which is that portion of the display on which an image can be reproduced. This relative location information includes distance D of the user's head 17 to the central reference point 31 on the display and relative position to the central reference point in the viewing plane, for example an angle θ to a vertical plane 35 oriented normal to the display 12, which can be calculated using simple trigonometry based on a predetermined location of the tracking device 14 to the central reference point 31 as for example defined by vector 32 therebetween and a measured location of the user's head 17 relative to the tracking device 14 as for example defined by vector 33 therebetween. Basically, the relative location information is a vector 34 interconnecting the user's head 17 and the central reference point 31 on the display 12. The distance D is a scalar magnitude of the user head location vector 34.

The software tracks the user's head position and distance from the central point 31 of the display 12. The head tracker component of the software is commonly available as open source and thus not described in further detail herein.

The software has a mathematical model of the actual, or real-world, surrounding space or room indicated at 36 in which the system 10 is located, the actual/real-world TV 12 and the location of the user's head 17. The software surrounds the configuration with a mathematical sphere 26 on which the virtual reality image is to be projected.

Thus simply by knowing head position (as defined by an angle from the vector 34 and reference plan 35) and distance from the display 12, the illusion of a window to another environment may be created, without 3D glasses. Additionally, it is not required that the user face the display 12 for the system to operate.

With the mathematical positions known, the software comprises an algorithm that traces the head location as a line 34 from the head, through the exact middle of the TV screen indicated at 31 and to a further exact point on the simulated inverse projection sphere 26. Since the projection sphere exists only in the software, the partial view a person would see of the sphere interior (with a texture of video or image, that is the projected image/video is overlaid on the projection sphere) is calculated, including "skew" and displayed on the real display 12.

For a clearer understanding of what the software does, imagine a small hole in the exact center of the display 12, and a rod pointing from the viewer's forehead through the hole and pointing therefore to the inside of the sphere. As the viewer walks in the room, the center point on the imaginary sphere 26 can be calculated and the software is able to calculate and prepare, frame by frame (24 or so frames a second) the exact position and scale of the image as if the sphere were a "skybox" with infinite size.

The vector 34 describing the user's head from the center of the TV to the user is thus determined, and mathematically through the center 31 of the TV, the vector can be extrapolated at 37 to identify the center point on the sphere 26 upon which the visible portion 28 of the source file to be displayed is determined, as more clearly shown in FIG. 1. Determining the visible portion 28 of the projected source file includes inversely scaling a size of the visible portion 28 relative to a size of the display 12 based on a distance D of the user's head 17 from the display 12. Scale of the image is proportional to the distance of the user from the real life screen. The closer the user is to the TV, the higher the amount of sphere surface is used. Like a real window, you can see more of the outside world when you stand close to it. The farther the user is from the TV, the less of the video image they see. To the user, the scale of objects in the narrative of the video does not change, adding to the illusion. Additionally, a peripheral shape of the visible portion 28 corresponds to or matches the peripheral shape of the display 12 so that the visible portion 28 may be properly formatted to the display 12.

The source file is thus readied for play in the software. The software projects the source file onto the interior of the sphere 26 and the source file is played here, and the image for the TV is calculated and send via video cable to the display. The image displayed is determined based on the current location of the user's head 17.

The hardware, specifically the tracking device 14, therefore detects location of the user's head 17 in the real world. The user or viewer may be seated, standing in fixed relation to the display (which typically is fixed in location) or moving relative to the display 12.

As the viewer's head 17 changes location in the real world, a software algorithm stored on the computing device 20 and the tracking device 14 detects this movement.

Figure 4:
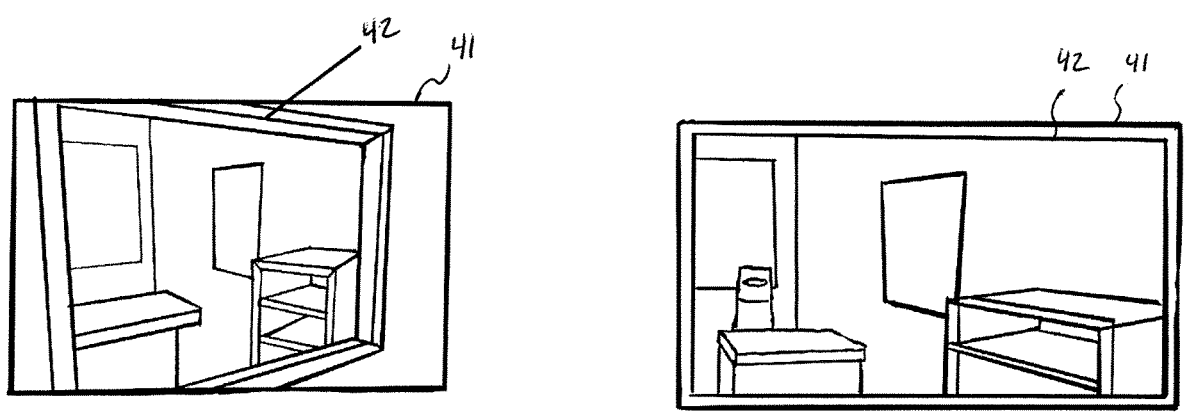
FIG. 4 illustrates skew correcting implementable by the arrangement of FIG. 1.

As the user moves relative to the display 12, i.e. walking, with the hardware tracking their head, the image on the display 12 is redrawn by the software to correspond to the current location of the user's head 17, which is different than before, so as to show the correctly corresponding section of the projection sphere 26 inside the software. In addition, the software corrects the visible portion 28 of the projected source file for skew, particularly for a display 12 which has a flat viewing plane (e.g., a flat panel TV), based on the location of the user's head 17 relative to a vertical plane 35 oriented normal to the mathematically modeled display 12, and typically located at the lateral center of the display, so that the displayed visible portion 28 has uniform scale across the surface area of the display 12. This is because the farthest point to the user on a flat display will normally appear smaller to the user than the corresponding point on a real window, as illustrated in FIG. 4 which on the left-hand side shows the view 41 of the user in an oblique position to a television screen 42 showing an image of an office interior, and on the right-hand side shows the same image corrected for the skew so as to provide the illusion of looking through a window where the image is scaled to the full view of the user as defined by the display 12 in the virtual reality system 10. In the illustrated arrangement correcting the visible portion 28 of the projected source file for skew comprises magnifying or enlarging areas of the visible portion 28 which are to be displayed on areas of the display 12 that are farther from the user's head 17 as determined based on the location of the user's head 17 relative to the vertical plane 35, and shrinking (i.e., reducing in size) areas of the visible portion 28 which are to be displayed on areas of the display 12 that are closer to the user's head 17 as determined based on the relative location of the user's head to the vertical plane 35. This may be performed by plotting the visible portion 28 of the projected source file on a grid, and then calculating which side, that is left, right, top or bottom, should be magnified, and skewing accordingly. In real life, one looks through a window. When one looks at a painting from the side, the parts of the painting closer will look bigger, of course. The system 10 skews parts of the image closer to the user down, adding to the illusion.

In this way the system 10 imitates what would be seen by a person looking through a real-world window, via software with a single input of the single user's estimated eye location.

As the viewer moves closer to the display 12, the amount of information increases. That is, the software describes a larger section of the sphere 26 playing the source file, just as a person moving closer to a real-world window sees more of a scene outside.

A third party observer watching the viewer and the display would see what looks like a "reverse zoom" as the user walks backwards, for example, of a statue in a scene getting larger, but to the viewer/user the statue remains the same size if measured by thumb and forefinger in an outstretched arm, just as would be the case if the user in real life was peering through a real window at a piazza containing a statue.

This illusion works well and best for depictions of the outside world, of which most 360/180 VR Videos are.

VR 360/180 video of the kind described herein are commonplace and taken with a camera with one or more "fisheye" lenses. They are typically viewed with VR Headset device and a phone whereby the viewer moves their head in real life while using such a device to get a view of the video-saved world, ahead of the viewer, or turning to the side or behind.

To reiterate, the software of the system uses head location and the illusion of a display as a viewing window. The software in addition corrects for "perspective skew." Because a TV is in fact flat, the picture is corrected to enlarge the parts of the image smoothly which are farthest from the user's head.

In this way, the user may have realistic depiction of a moving scene as it would be seen through a real-world window. The corrections for distance and skew create this illusion without the need for a user-worn optical device such as a headset or special glasses.

360/180 'films' may be streamed onto the projection sphere 26, from the Internet, or played locally without an Internet connection. For example, snowy landscapes, underwater, tourism films of Italy and Africa all work with the system.

Figure 5:
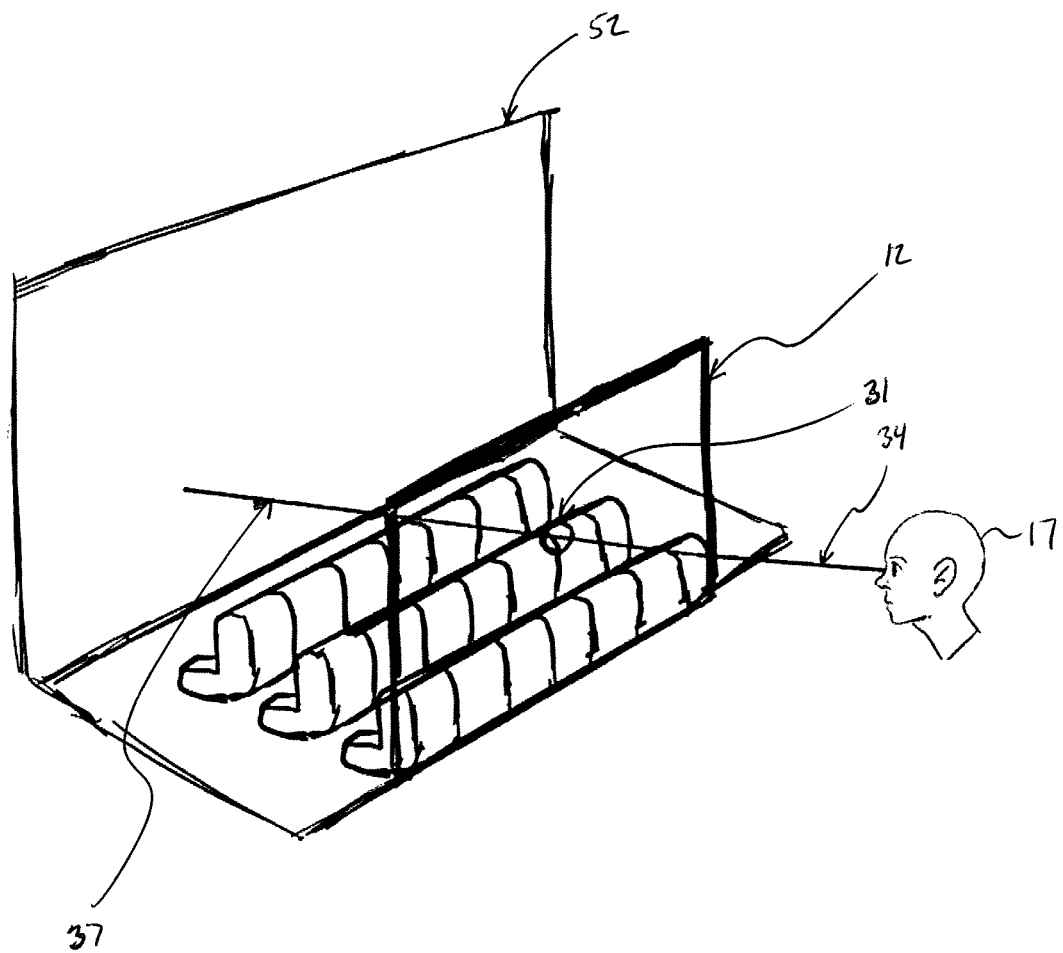
FIG. 5 illustrates an example application in which the virtual reality system provides a movie theatre effect.

One may also view "regular" films appearing a little like they are in a theatre schematically indicated at 52, as shown in FIG. 5, and 180/360 video appearing like images and moving scenes from real life, by positioning them in a virtual movie theatre, with a saved 360 image of a theatre in the software, and the video pictured on the virtual screen, giving the illusion of being in a larger cinema.

For objects that are quite far away, say more than 30 meters, 3D, parallax play a much smaller role in observing the outside world. It only has to move as it would in nature. What if there was a way to accomplish this without a headset?

VSPR stands for virtual single-point reality or virtual single-person reality. Basically, using different versions of video, the system creates the illusion of looking through a real, moving window. VSPR does two things differently. Suppose you are looking at a video (more on the type later), as you walk, it behaves just like a window.

The system 10 is operable with a source file in the format of 360 or 180 video which is projected on the inside of a sphere (very common format: YouTube/Facebook/Vimeo/GoPro).

In FIGS. 1, V1 and V2 represent two views respectively of where the viewer is looking in simulated space. All calculations to an infinitely-large sphere reduce to a line drawn from between the viewer's eyes to the inverse sphere (upon which the source file is projected and moving) in virtual space inside the computing device 20.

For a user who moves from location V1 to V2 the picture adjusts perfectly and smoothly.

The screen must be corrected for real-world perspective, as mentioned, for deeper illusion, with the image skewed. The closer in real life the user is to part of the TV screen, the adjustment in scale down accordingly, so the only perspective changes come as if from a real window and as described.

In the arrangement shown in FIG. 5, the source file may be a conventional two-dimensional video which is projected on half of the inverse spherical virtual screen 26. That is, regular video is still projected onto an inverse sphere and with an additional environment (like a movie theatre) around it and also projected on the sphere.

Regular TVs can be outfitted with a VSPR system and regular video used on a virtual movie theatre. The TV becomes a "window" into a theatre in which you are seated. Moving a little on the couch causes the appropriate response. (The content can be Netflix movies, or other in standard HD format.)

Figure 6A:
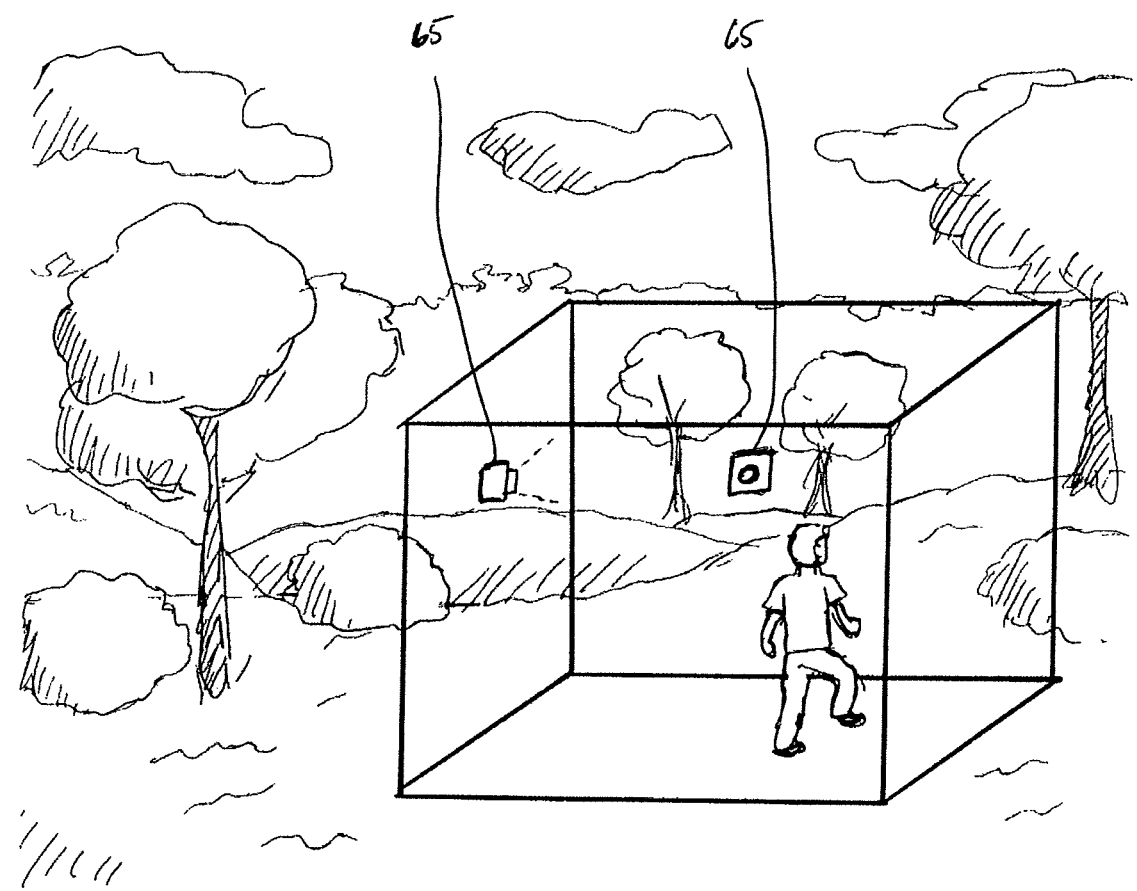
FIGS. 6A and 6B illustrate an example application where the display comprises a plurality of projectors each oriented in a different direction so as to show cooperating images on a plurality of surfaces in a room.
Figure 6B:
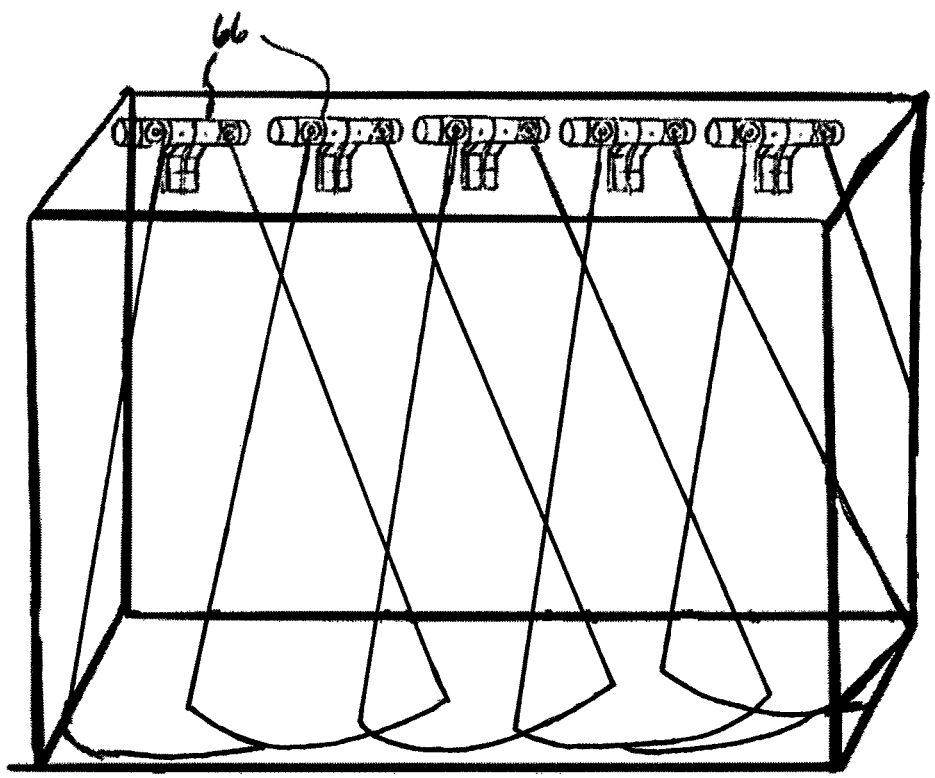

FIGS. 6A and 6B generally show an arrangement where the display comprises a plurality of displays each positioned relative to a common viewing space so that each display shows a different visible portion of the same projected source file that is viewable through a corresponding one of the displays to the same user. More specifically, FIGS. 6A and 6B shows the display as comprising a plurality of projectors schematically shown at 65 each oriented in a different direction so as to show one of a plurality of cooperating images on a different wall surface of a room. This works with wall projection cameras 66 on 1-6 or more surfaces (walls "disappear" as you walk in the room"), as the system corrections and projects 1-6 images on the walls. In such arrangements, determining the visible portion of the projected source file comprises determining a respective visible portion of the same projected source file viewable through a corresponding one of the displays to the same user.

Passive scenes would also benefit from this, or multiple whole—wall projections, or virtual windows, etc.

Because the system 10 uses distortion, a mounted hub of 1-5 cameras to be utilized to create a room-sized seamless projections, that react as you move.

Alternatively, the source file may also be computer graphics (CG)-realized environments such as games, which have 360 degrees of content, and where user movement can be used as a "controller" for interactivity.

Additional spheres with content, such as blurred leaves over still images can be used to compliment the primary content. A "content sphere" for leaves would be rotate faster than the background and add to the illusion of a real window. For video, spheres with alpha channels and video can be added for layered 3D content if desired in a new "VSPR" formatted presentation.

Thus, a plurality of source files for example videos may be concurrently projected on the inverse spherical virtual screen so that the projected source file is layered, in this example a layered video.

Other applications of the system 10 include:

Exercise—watch TV and have to move to enjoy the content. Just using the system rewards the user for movement.

Desktop Enhancement on PC—a VSPR mode on a PC would allow a larger desktop than the monitors can depict.

Regular Video games or a new breed of video games benefit from this type of "Camera"; we have a bowling game that works with it, one can even design a whole video game around the movement and rather than a full body tracker, only a face tracker is needed.

Still, Panoramic or 360 photos are viewed well with VSPR.

The scope of the claims should not be limited by the preferred embodiments set forth in the examples but should be given the broadest interpretation consistent with the specification as a whole.

The invention claimed is:

1. A virtual reality system comprising:
   a display configured for displaying an image to a user;
   a tracker configured for detecting location of the user's head relative to the display; and
   a computing device respectively operatively connected to the display and to the tracking device, the computing device having a processor and a non-transitory memory which are operatively interconnected so that the processor can execute instructions stored on the memory for:
      projecting a source file on an inverse spherical virtual screen surrounding a mathematical model of the display, wherein the source file comprises at least one image;
      using a mathematical model relating the location of the user's head, the mathematical model of the display and the virtual screen, determining a visible portion of the projected source file viewable to the user through the display acting as a viewing window between the user and the projected source file, which comprises:
         (i) forming a vector from the user's head through the display to the virtual screen to generally define a visible section of the virtual screen, and
         (ii) inversely scaling the visible section of the virtual screen based on a distance of the user's head from the display along said vector; and
      displaying on the display said visible portion of the projected source file.

2. The virtual reality system of claim 1 further including correcting the visible portion of the projected source file for skew based on the location of the user's head relative to a vertical plane oriented normal to the mathematically modeled display so that the displayed visible portion has uniform scale across the surface area of the display.

3. The virtual reality system of claim 1 wherein the mathematical model also includes a surrounding space in which the display is located.

4. The virtual reality system of claim 1 wherein the display comprises a plurality of displays each positioned relative to a common viewing space so that each display shows a different visible portion of the same projected source file that is viewable through a corresponding one of the displays to the same user.

5. A computer-implemented method for generating a virtual reality environment on a system without a user-worn optical device, the system including a display for displaying an image to a user, a tracking device for detecting location of a user's head relative to the display, and a computing device respectively operatively connected to the display and to the tracking device, the computing device having a processor and a non-transitory memory which are operatively interconnected so that the processor can execute instructions stored on the memory, the method comprising:

projecting, using the computing device, a source file on an inverse spherical virtual screen surrounding a mathematical model of the display, wherein the source file comprises at least one image;

using a mathematical model relating the location of the user's head, the mathematical model of the display and the virtual screen, determining, using the computing device, a visible portion of the projected source file viewable to a user through the display acting as a viewing window between the user and the projected source file, which comprises:
(i) forming a vector from the user's head through the display to the virtual screen to generally define a visible section of the virtual screen, and
(ii) inversely scaling the visible section of the virtual screen based on a distance of the user's head from the display along said vector; and displaying on the display said visible portion of the projected source file.

6. The computer-implemented method of claim 5 further including correcting the visible portion of the projected source file for skew based on the location of the user's head relative to a vertical plane oriented normal to the mathematically modeled display so that the displayed visible portion has uniform scale across the surface area of the display.

7. The computer-implemented method of claim 5 wherein the mathematical model also includes a surrounding space in which the display is located.

8. The computer-implemented method of claim 5 wherein the display comprises a plurality of displays each positioned relative to a common viewing space and determining the visible portion of the projected source file comprises determining a respective visible portion of the same projected source file viewable through a corresponding one of the displays to the same user.

9. A non-transitory computer readable storage medium storing instructions that are executable to:

project a source file on an inverse spherical virtual screen surrounding a mathematical model of a real display for displaying an image to a user, wherein the source file comprises at least one image;

using a mathematical model relating the location of the user's head, the mathematical model of the real display and the virtual screen, determine a visible portion of the projected source file viewable to the user through the real display acting as a viewing window between the user and the projected source file by:
(i) forming a vector from the user's head through the display to the virtual screen to generally define a visible section of the virtual screen, and
(ii) inversely scaling the visible section of the virtual screen based on a distance of the user's head from the display along said vector; and display on the real display said visible portion of the projected source file.

10. The non-transitory computer readable storage medium of claim 9 further including instructions to correct the visible portion of the projected source file for skew based on the location of the user's head relative to a vertical plane oriented normal to the mathematically modeled display so that the displayed visible portion has uniform scale across the surface area of the display.

11. The non-transitory computer readable storage medium of claim 9 wherein the mathematical model also includes a surrounding space in which the display is located.

12. The non-transitory computer readable storage medium of claim 9 wherein when the real display comprises a plurality of real displays each positioned relative to a common viewing space, the instructions to determine the visible portion of the projected source file comprise determining a respective visible portion of the same projected source file viewable through a corresponding one of the displays to the same user.

13. The virtual reality system of claim 1 wherein displaying on the display the visible portion of the projected source file includes scaling a size of the visible portion on the display proportionally to the distance of the user's head from the display.

14. The computer-implemented method of claim 5 wherein displaying on the display the visible portion of the projected source file includes scaling a size of the visible portion on the display proportionally to the distance of the user's head from the display.

15. The non-transitory computer readable storage medium of claim 9 wherein the instructions to display on the real display the visible portion of the projected source file include instructions to scale a size of the visible portion on the display proportionally to the distance of the user's head from the display.

* * * * *